United States Patent

[11] 3,596,572

[72] Inventor Kenji Matsuura
  Ikeda, Japan
[21] Appl. No. 815,432
[22] Filed Apr. 11, 1969
[45] Patented Aug. 3, 1971
[73] Assignee Sumitomo Electric Industries, Ltd.
  Osaka, Japan
[32] Priority Apr. 12, 1968, Aug. 27, 1968
[33] Japan
[31] 43/24,027 and 43/73,355

[54] INSULATION FOR POWER CABLE JOINTS AND A METHOD OF MAKING SAME
5 Claims, 10 Drawing Figs.

[52] U.S. Cl............................................. 93/1,
  53/32, 93/94, 156/53, 156/446,
  156/481, 174/84, 174/110
[51] Int. Cl................................................... B31d
[50] Field of Search............................................ 93/1, 81,
  94; 174/120 FP, 110.2, 84, 167, 73; 156/446, 457,
  481, 53/32; 156/52, 53

[56] References Cited
UNITED STATES PATENTS
3,017,306 1/1962 Priaroggia..................... 174/84 X Primary Examiner—Bernard Stickney
Attorney—Sughrue, Rothwell, Mion, Zinn & Macpeak ABSTRACT: An insulation for power cable joints wherein a previously shaped split-type paper cylinder is placed over the cable core such that the outside edge thereof forms a snaillike borderline.

PATENTED AUG 3 1971 3,596,572

INVENTOR

BY

ATTORNEY

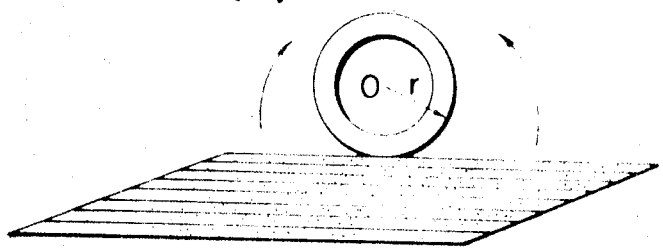
FIG. 7
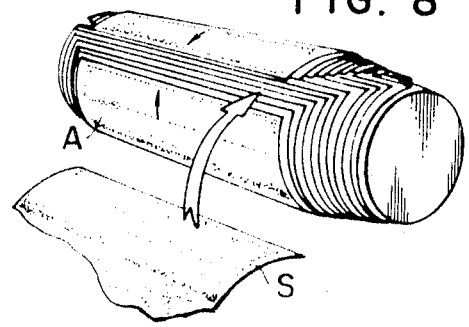
FIG. 8
FIG. 9a
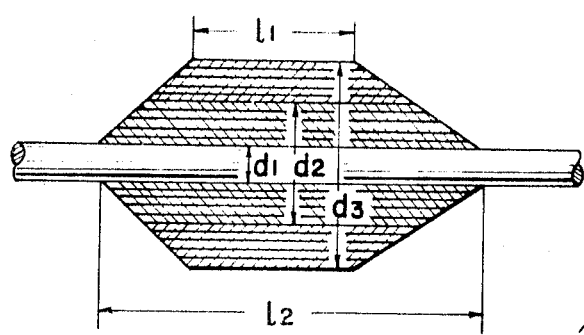
FIG. 9b
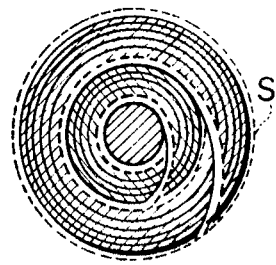

INSULATION FOR POWER CABLE JOINTS AND A METHOD OF MAKING SAME

This invention relates to insulation used at the joints of power cables of the SL type, OF type, POF type, etc. It has been the practice heretofore to manually wrap the joints of power cables of the aforementioned types with oil-impregnated paper, sheet by sheet or tape by tape. This method has serious drawbacks in that constructing such insulation in the field takes considerable time and that during this period moisture is readily absorbed by the insulation due to the surroundings in which such construction takes place, for example, in manholes, etc.

The object of the present invention is to eliminate these drawbacks and to obtain an insulation which materially reduces the time required for the operation of joining power cables and which prevents the absorption of moisture and thereby materially increases the dielectric strength of the insulation. This invention is characterized in that one layer or a plurality of layers of previously formed paper cylinders of the split type are placed over the cable cores.

BRIEF EXPLANATION OF THE DRAWINGS

FIG. 7 shows the laminated paper layers of FIG. 6 in the shifted form;

FIG. 8 shows another example of an insulated joint formed by the method of the present invention; and FIGS. 9a and 9b show cross-sectional views of the joint of insulation shown in FIG. 8.

DETAILED DESCRIPTION OF THE INVENTION

Figure 1:
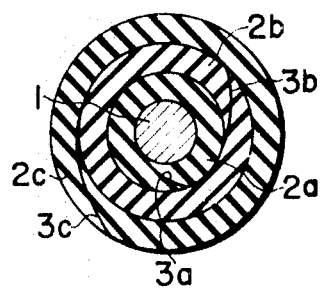
FIG. 1 is a cross-sectional view of an example of the insulation of the present invention.
Figure 2:
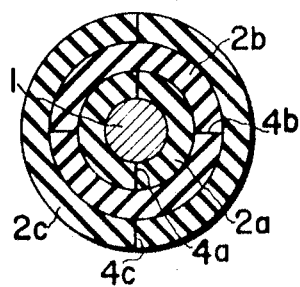
FIG. 2 is an imaginary cross-sectional view for the purpose of comparison with the insulation of the present invention.

The invention will now be explained with reference to the examples shown in the drawings. In FIG. 1, the cable core 1 has insulation 2a of this invention wound over the cable core 1 to form a split borderline 3a as will be described later. FIG. 1 shows three layers of insulation 2a, 2b, and 2c. Layer 2a is wound adjacent the cable core 1 and has a split borderline 3a. A second layer 2d is wound adjacent layer 2a and has a split borderline 3b. A third layer 2c is wound around layer 2b and has a split borderline 3c. The snaillike split borderline, for example 3a, is formed by winding the insulation 2a over the cable core 1 and also over the insulation itself in a manner which will now be explained. Suppose that, for example, cylindrical insulation, such as that shown at 2a in FIG. 2, is made of paper and is placed over the cable core 1 and a split borderline 4a is cut in a radial direction with a knife and wherein a second layer of insulation 2b and a third layer of insulation 2c are provided over insulation layer 2a and similar borderlines 4b and 4c are cut in radial directions in the insulations 2b and 2c, respectively. Now consider the direction of field vector at the borderlines 4a, 4b and 4c when a voltage is applied. Since the direction of the field vector almost coincides with the direction of the borderline, the dielectric strength at the borderlines 4a, 4b, 4c becomes minimal and insulation breakdown is most likely to occur at these points.

Figure 3:
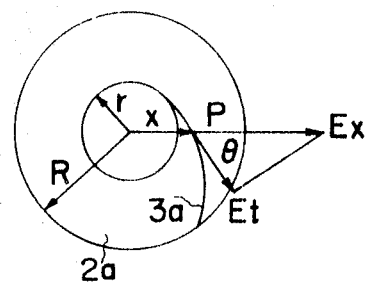
FIG. 3 is a diagram of the field vector on the borderlines of the insulation of the present invention.

According to the present invention, however, the borderlines 3a, 3b, 3c are not in the radial direction but in fact make snaillike curves as shown in FIG. 1 so that the dielectric strength at the borderline parts is made considerably greater. This will be explained with reference to FIG. 3. Field vector $E_t$ in the tangential direction at point P (distance from the center represented by X) on the split borderline 3a formed in the insulation 2a of the cable joint having an inner radius r and an outside radius R is:

$$E_t = \frac{V \cos\theta}{X \ln\left(\frac{R}{r}\right)}$$

Vector $E_x$ in the radial direction is:

$$E_x = \frac{V}{X \ln\left(\frac{R}{r}\right)}$$

where $V$ is the voltage applied across the insulator. Hence, $E_t$ is $E_x$ multiplied by $\cos\theta$. Since $\cos\theta$ is less than 1, it is possible to enhance the breakdown voltage at point P considerably. It is also possible to make $\theta=90°$ at a point on the inside electrode ($X=r$) where field intensity in the radial direction is the greatest, so that the component of field vector parallel to the split borderline is zero.

Figure 4:
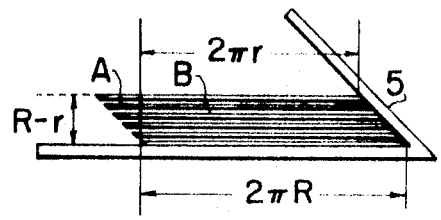
FIG. 4 shows the frame for preparing the insulation according to the present invention.

The method of making the insulation 2a which has the aforementioned split borderline 3a will be explained. First, a frame 5 having a gradient of $1/2\pi$ as shown in FIG. 4 is prepared. Paper cut into sheets of the same size having a length of $2\pi R$ is put into the frame, the sheets are then placed on top of each other until the thickness becomes R—r. The ear part A at the left end is then cut off. A laminated body B having a top length of $2\pi r$ and a bottom length of $2\pi R$ is obtained in this manner.

Figure 5:
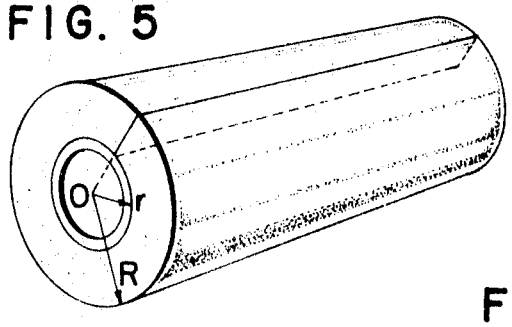
FIG. 5 shows another example of the method of producing the insulating joint for the power cable of the present invention.
Figure 6:
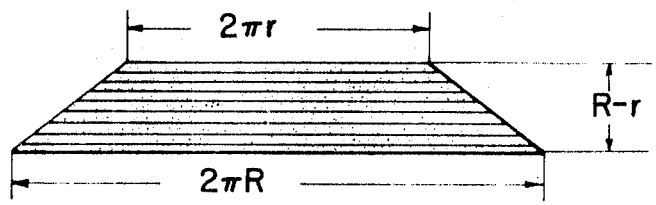
FIG. 6 shows the resultant paper layers cut along the radial direction as shown in FIG. 5.

Another method of producing an insulating joint for a power cable wherein each of the cylindrical insulating layers have snaillike cross-sectional mating line will now be described with reference to FIGS. 5, 6 and 7. Here, a sheet of insulating paper is continuously wound on a pipe having a radius of $r$ until the external radius of the insulating layer becomes R. Then, the resultant paper layer is cut in the radial thickness direction as shown in FIG. 5 and unfolded to obtain laminated paper sheets having a trapezoidal cross section as shown in FIG. 6. The length of the upper side, bottom side and height of the trapezoid are $2\pi r$, $2\pi R$ and Rr, respectively. Each paper sheet is then shifted to form the laminated paper sheets having a cross section as shown in FIG. 7, and successively wound on a cylinder which has an outer radius of r to obtain a cylindrical insulator having the snaillike cross-sectional mating line that is shown at 2a and 3a of FIG. 3. The insulation, after having been shaped in this manner, is treated by drying, oil-impregnation and the like and is then used for reinforcing insulation for power cable joints.

Previously, it took no less than 5 hours to apply reinforcing insulation to a 275 kv. oil-filled cable joint. By using the reinforcing insulation of the present invention, the application of such insulation now only requires about 30 minutes. The actual joining operation has also been greatly simplified. The dielectric strength is also greatly improved because the borderline is not in a radial direction. Further, because the lapping of the sheets of paper is not done individually, as in the past, the present operation prevents the insulation from absorbing moisture even when the operation is carried out in a wet manhole. In addition, because the area of the snaillike overlap portion is larger, the mechanical strength of the final insulation is greater.

In another example of the present invention, one or more sheets of oil-impregnated paper or plastic film(s) are inserted into a mating face formed by both ends of each cylindrical insulator layer and are wound on the peripheral surfaces of the cable core. The cylindrical insulator layers, as shown in FIG. 8, make the winding of the insulating layer cylindrically on the cable core surface and underlying insulator cylinder easy.

FIG. 9a shows a cross-sectional view of the joint of insulator layer wound on power cable along the cable's length, and FIG. 9b shows a cross-sectional view of the same joint taken perpendicular to cable's length.

In FIG. 9b, the dotted line(s) shows a sheet of oil-impregnated paper or plastic film wound on the cable core surface and the insulator layer surface and also inserted into a mating face between both ends of the cylindrical insulator layer. This makes the winding or wrapping of the insulating layer easy and also acts to compact the joint assembly which is composed of the cable core and the insulating layers.

In an insulated joint of the 70 kv., 600 mm.² single core OF-type cable having diameters $d_1=49.3$ mm., $d_2=70$ mm., $d_3=90$ mm., and length of $l_1=280$ mm., and $l_2=720$ mm., and an oil-impregnated paper of a thickness of 0.125 mm., the results of a sustained alternating current application breakdown test and impulse breakdown test were 225 kv. and 580 kv., respectively. The voltages which resulted from the aforementioned breakdown test are comparable to or superior to those which are obtained by the conventional "tape-on-tape" winding method for forming an insulated joint.

The rewinding of an unfolded insulating layer is easily accomplished because of the existence of the oil-impregnated paper or plastic film placed between the insulating layers or between the insulating layer and the cable core. This also results in an increase in the packing or tightening force of the insulating layers. Further, the cable core and insulating layers adhere to each other well which results in a compact joint assembly which has an increased breakdown strength. This insulating assembly is especially well suited for joints in OF-type cables or POF-type cables which have applied voltages of between 70 and 500 kv.

What I claim is:

1. A method of making insulation for power cable joints comprising the steps of:
    a. cutting identical size sheets of paper,
    b. placing the sheets of paper one on top of the other in a frame having a gradient of $1/2\pi$ to form a laminate,
    c. cutting off an edge portion of the laminate, and
    d. removing the laminate from the frame and winding the laminate into a cylindrical shape such that each sheet is shifted from each other so as to form a snaillike borderline.

2. A method of making insulation for power cable joints comprising the steps of:
    a. winding a sheet of insulating paper continuously on a pipe to form a plurality of layers of said paper,
    b. cutting said layers in the radial direction,
    c. unfolding said layers to form a laminate of trapezoidal cross section,
    d. shifting the position of said layers of said laminate with respect to each other, and
    e. rewinding said laminate so as to form a snaillike borderline in cross section.

3. A method of making insulation of the thickness $R-r$ for power cable joints whose overall radius is R and whose uninsulated radius is $r$, comprising the steps of:
    a. stacking a plurality of sheets of insulation of varying length to form a laminated body having a height of $R-r$, a top length of $2\pi r$ and a bottom length of $2\pi R$,
    b. shifting each sheet of said laminated body with respect to the adjacent sheet in the direction of winding, and
    c. winding the same at right angles to the longitudinal axis into a cylindrical shape to form a snaillike borderline in cross section.

4. The method as claimed in claim 3, wherein said step of stacking said plurality of sheets of insulation includes, first, cutting sheets of insulation of identical width, placing said sheets one on top of the other and in a frame having an inwardly and upwardly inclined lateral end piece to define a gradient of $1/2\pi$ for forming said laminated body, and severing the edge portion opposite said end piece of said laminated body at right angles to the lateral plane of the same.

5. The method as claimed in claim 3 wherein said step of stacking a plurality of sheets of insulation includes initially winding a sheet of insulation continuously on a cylinder to form a plurality of layers of said insulation, cutting said layers in a radial direction to said cylinder, and unfolding said layer to form said laminated body of trapezoidal cross section.